United States Patent [19]

Johnson, Jr. et al.

[11] Patent Number: 4,514,809
[45] Date of Patent: Apr. 30, 1985

[54] DYNAMIC RANGE CONTROL OF ELECTRODE PAD CURRENT IN WELL LOGGING TOOLS

[75] Inventors: Wade M. Johnson, Jr., Cypress, Tex.; Jorg A. Angehrn, Brea, Calif.

[73] Assignee: Dresser Industries, Inc., Dallas, Tex.

[21] Appl. No.: 373,776

[22] Filed: Apr. 30, 1982

[51] Int. Cl.$^3$ .............................................. G01V 3/28
[52] U.S. Cl. .................................. 364/422; 324/366; 367/65
[58] Field of Search ................. 364/422, 573; 324/347, 324/355, 365, 357, 371, 373, 375, 366; 367/26, 65, 66, 98

[56] References Cited

U.S. PATENT DOCUMENTS

| | | | |
|---|---|---|---|
| 2,712,627 | 7/1955 | Doll | 324/352 |
| 3,105,190 | 9/1963 | Norris | 324/339 |
| 3,205,433 | 9/1965 | Lamb | 324/371 |
| 3,790,910 | 2/1974 | McCormack | 364/573 X |
| 3,947,756 | 3/1976 | Ryss | 324/357 |
| 4,399,416 | 8/1983 | Gillespie | 367/65 X |
| 4,439,831 | 3/1984 | Sinclair | 364/422 |

Primary Examiner—Jerry Smith
Assistant Examiner—Clark A. Jablon
Attorney, Agent, or Firm—Patrick H. McCollum; Richard M. Byron

[57] ABSTRACT

In apparatus for investigating earth formations traversed by a borehole, improved methods and apparatus are provided for achieving dynamic range control of formation measurements. In one embodiment adapted to formation resistivity measurements, a well logging tool moving through a borehole emits a current into the adjacent earth formation, and a corresponding measurement voltage correlative to the resistivity is sampled at discrete elevations as the tool traverses the borehole. An average of these voltage measurements is formed. When the magnitude of this average exceeds or drops below a predetermined range, the magnitude of the survey voltage is decreased or increased respectively by a discrete amount.

30 Claims, 8 Drawing Figures

DYNAMIC RANGE CONTROL OF ELECTRODE PAD CURRENT IN WELL LOGGING TOOLS

BACKGROUND OF THE INVENTION

This invention relates to methods and apparatus for investigating earth formations traversed by a borehole, and more particularly relates to methods and apparatus for achieving range control of formation measurements.

It is well known that many of the parameters which are desirably measured in a well logging operation vary over large dynamic ranges from borehole to borehole and within a particular borehole itself due to variations in formation characteristics sought to be investigated.

As but one example, in the case of electrical logging, it has been found that formation resistivities encountered may vary from 0.2 ohm-meters to over 10,000 ohm-meters. In the early instruments for measuring such resistivities, typically a constant reference voltage (or current) was induced into the formation and a measure voltage which thus varied as a function of changing formation resistivities was detected. One exemplary type of such instrument is disclosed, for example, in U.S. Pat. No. 2,712,627 to H. G. Doll.

However, it was found that as the formation conductivity varied from 5 mMHO/m to 0.5 mMHO/m this measure voltage would typically vary over a 10,000:1 ratio, exceeding the dynamic range capability of even the best instrumentation amplifiers and the like, particulary in the adverse conditions encountered in the borehole. Clearly, some means was desirable to reduce the necessity of providing downhole circuitry associated with measurement of these parameters which would maintain accuracy over such large signal ranges.

One such attempt to reduce the aforementioned dynamic range problem is disclosed in U.S. Pat. No. 2,776,402 to F. P. Kokesh. The approach essentially was to employ a surveying current which diminished systematically as formation resistivity increased, resulting in measurements of resistivity which became non-linear as full scale value was approached. This approach is not unlike the attempt of logging operators in the past to manually adjust survey currents during logging operations, a practice which was fraught with difficulties which included variation in operator response time (resulting in lost data), lack of recording the magnitude of current changes rendering absolute resisitivity measurements impossible and the like.

While this technique tended to reduce the dynamic range problem somewhat, a major disadvantage was that it required anticipation of the formation resistivity range to be encountered, in that the value of a resistive means utilized to reduce the survey current was selected in accordance therewith.

Yet another approach was taught by L. Henry, et al in U.S. Pat. No. 3,539,910. In this technique, means were provided for adjusting the survey current so as to maintain the product of the current and the resulting measured voltage constant (i.e., a constant power system), resulting in a dynamic range reduction of a square root factor.

This approach however also suffered from major disadvantages, only one of which being, for example, that multiplying circuitry for providing the current-voltage product was typically extremely sensitive to temperature variations and other conditions of the deleterious environment of a borehole, rendering their application impracticable.

Yet another problem with the previous attempts to achieve a range control in well logging devices particularly of the resistivity measuring type is that any such adjustments in gains were generally made based upon current parameter measurements and were thus relatively unsophisticated in a sense that a decision to change gain was based upon a relatively simple criteria which was invariant and thus insensitive to previously measured parameters. Provision has not been made therefore for adaptive gain ranging wherein the gain may be adjusted as a function of a history of plurality of prior measurements.

Although some prior devices such as those discussed above achieve such range control by adjusting current or voltage signals, they do not record the magnitudes of such gain adjustments. Such recorded adjustments may be used to obtain representation of actual formation resistivities rather than merely relative changes in resistivity.

Thus, the prior devices, by not making use of the adjustment magnitudes, thereby discard valuable information which may be used to more particularly determine the nature of the formation being investigated. The present invention overcomes this disadvantage by recording and utilizing the magnitudes of these adjustments.

The disadvantages of the prior art are overcome by the present invention and the improved methods and apparatus are provided for achieving range control of measurements resulting from earth formation investigating apparatus.

SUMMARY OF THE INVENTION

In apparatus for investigating earth formations traversed by a borehole, improved methods and apparatus are provided for achieving range control of formation measurements. An electrode means establishes a current flow in an earth formation. Responsive to the electrode means is a circuit means for deriving the apparent magnitude of the current flow. An averaging means derives a function of such measured current flow and at least one other previously measured current flow. A comparator means interconnected with the averaging means detects when the function is outside a predetermined standard magnitude range. Interconnected with the comparator means is a correction means for adjusting the current flow when the function is outside the range. The magnitude of current flow adjustment as well as the measured, apparent magnitude of the current flow are separately recorded and later correlated to obtain a visual or numerical representation of formation resistivity.

It is a feature of the present invention to automatically and discretely alter the range of apparent magnitudes of currents flowing through an earth formation between an upper and a lower limit to provide increased accuracy in measuring formation resistivity.

It is another feature of the present invention to employ a history of previously measured magnitudes of formation current flows to adjust subsequent current flows thereby maintaining formation measurements between an upper and a lower limit.

It is yet another feature of the present invention to adjust magnitude of current flow in a resistivity measuring well logging apparatus in discrete steps as a function of prior measured current flows.

It is still another feature of the present invention to transmit to the surface magnitudes of current flow adjustments made in a resistivity measuring well logging apparatus in response to prior measured flows.

These and other features and advantages of the present invention will become apparent from the following detailed description of a preferred embodiment.

DETAILED DESCRIPTION

The present invention relates to methods and apparatus for achieving range control of formation measurements. As such it is contemplated that the teachings herein will have beneficial application to numerous well logging tools wherein large dynamic parametric ranges are encountered. Accordingly, all such applications are within the scope of the subject invention and the invention is thus not intended to be limited by disclosure of its application with respect to one particular class of logging tools.

One such application wherein the present invention is particularly beneficial is in the class of tools wherein measurement of conductivity or its inverse, resistivity, of the earth formation is desired due to the previously noted large ranges in formation resistivity frequently encountered. The general techniques of injecting current flow into the formation to be measured and monitoring the potential drop across a resistor in series therewith as an indication of formation conductivity is well known in the art. Numerous techniques have been devised for example for insuring, by various combinations of electrodes and associated circuitry, that current flows into the formation and not the drilling fluid in order that potential drop and thus the resistivity measured is that of the formation and not the fluid.

Thus, detailed discussion of the various techniques associated with resistivity logging will not be herein offered. Rather, the discussion of H. G. Doll "The Micro Laterolog", *Journal of Petroleum Technology*, January 1953, and "The Laterolog" *Journal of Petroleum Technology*, November 1951, are herein incorporated for all purposes.

One particular form of resistivity logging involves conceptually the application of four resistivity log instruments disposed in quadrature in a plane perpendicular to the logging string in a manner so as to inject current and thus to measure resistance at four quadrants perpendicular to the axis of the borehole. By comparing the four resistivity measurements derived at various borehole increments, indications of formation dip and the like may be derived which are, in like manner, known in the art and thus not herein detailed. Accordingly, although application of the present invention to such a particular form of logging measurement (known as a "dip" meter measurement) is disclosed herein, there is no intent to so limit application of the subject invention.

Figures 1, 4:
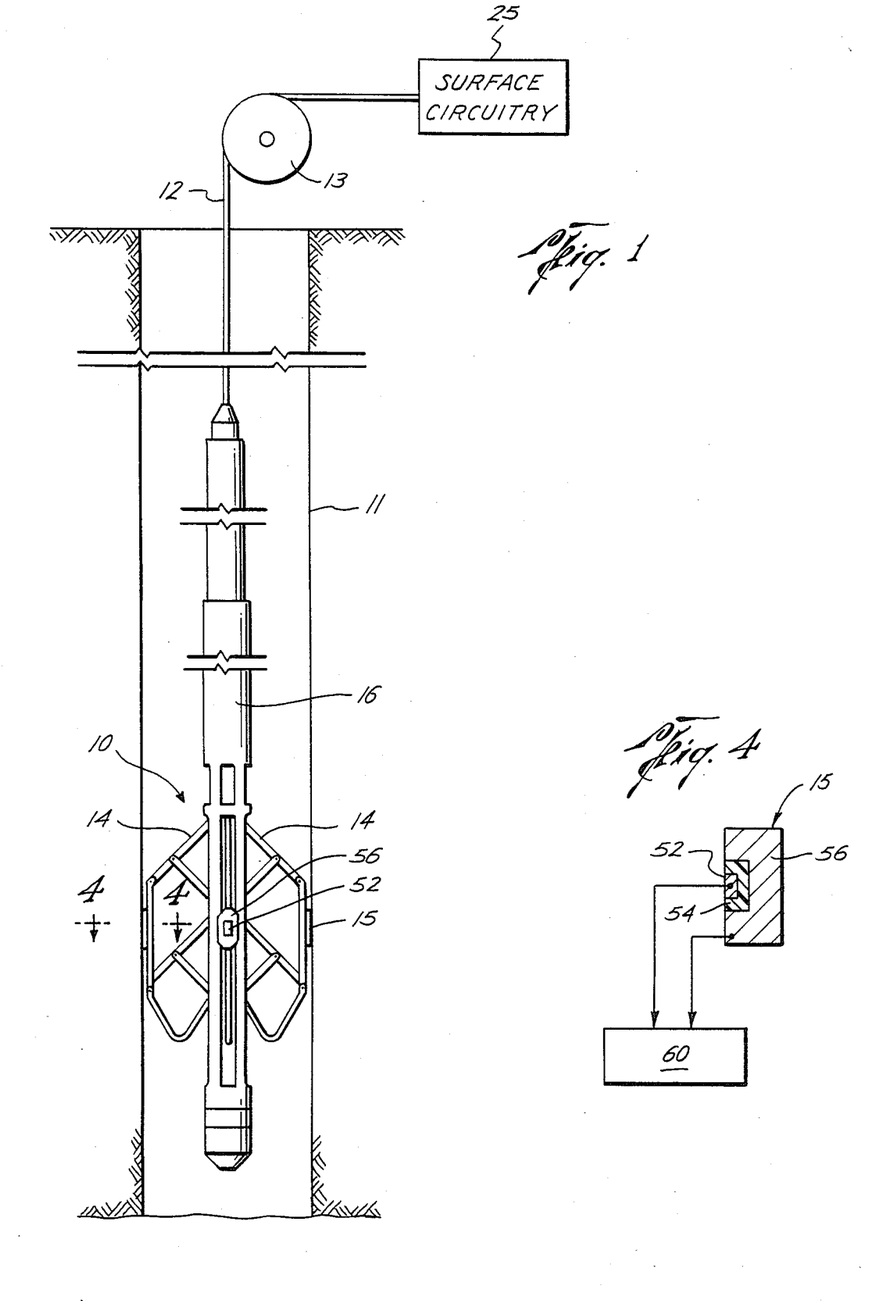
FIG. 1 is a cross-sectional view of one embodiment of the present invention employing a respresentative resistivity measuring device of the dip meter type disposed in a borehole.
FIG. 4 is a cross-sectional schematic view of a probe pad electrode.

Referring first to FIG. 1, there may be seen a typical formation resistivity measuring well logging tool (in this case a dip meter tool 10) suited to the teachings of the present invention. In a typical operation, tool 10 is lowered down borehole 11 by means of cable 12 and winch 13. Tool 10 has one or more arms 14 and corresponding probe pads 15 for contacting the sides of borehole 11 to obtain formation data. Affixed to each probe pad 15 is an emitting pad "button" or electrode 52 for emitting known currents into the surrounding earth formation. Each probe pad 15 also has a metal guard electrode 56 which encircles and is concentric with emitting electrode 52. Metal guard electrode 56 acts to ensure that the potential difference across the entire pad remains near zero to insure that current is injected into the formation, thus preventing survey current from flowing up the borehole without entering the formation. The measured voltages are processed and interpreted by processing circuitry 16 generally located in the upper portion of tool 10. Also located in tool 10 is telemetry circuitry for transferring data between the tool and surface circuitry 25, as is more fully discussed below.

Figure 2A:
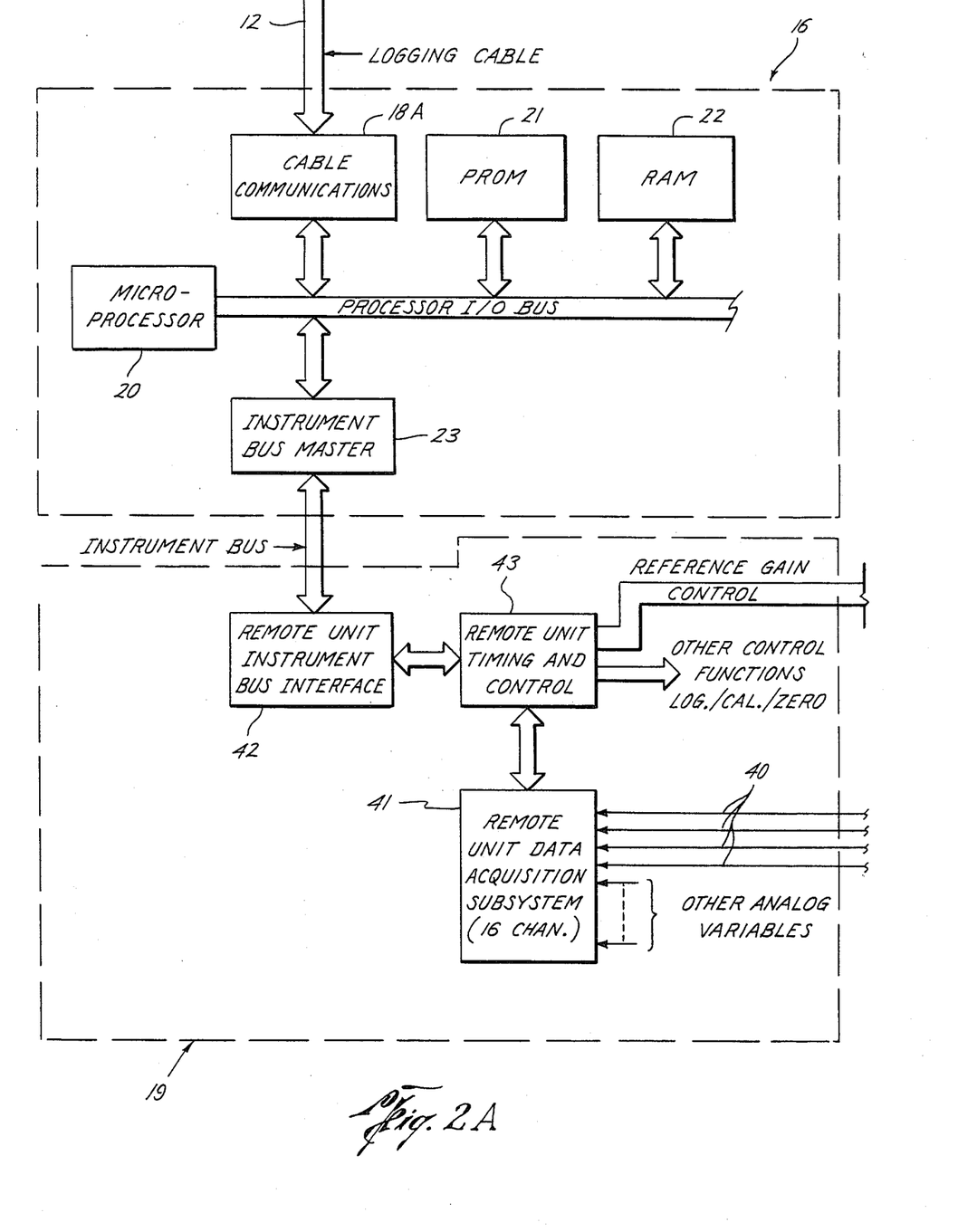
FIGS. 2A and 2B are functional block diagrams of well logging apparatus according to the present invention.
Figure 2B:
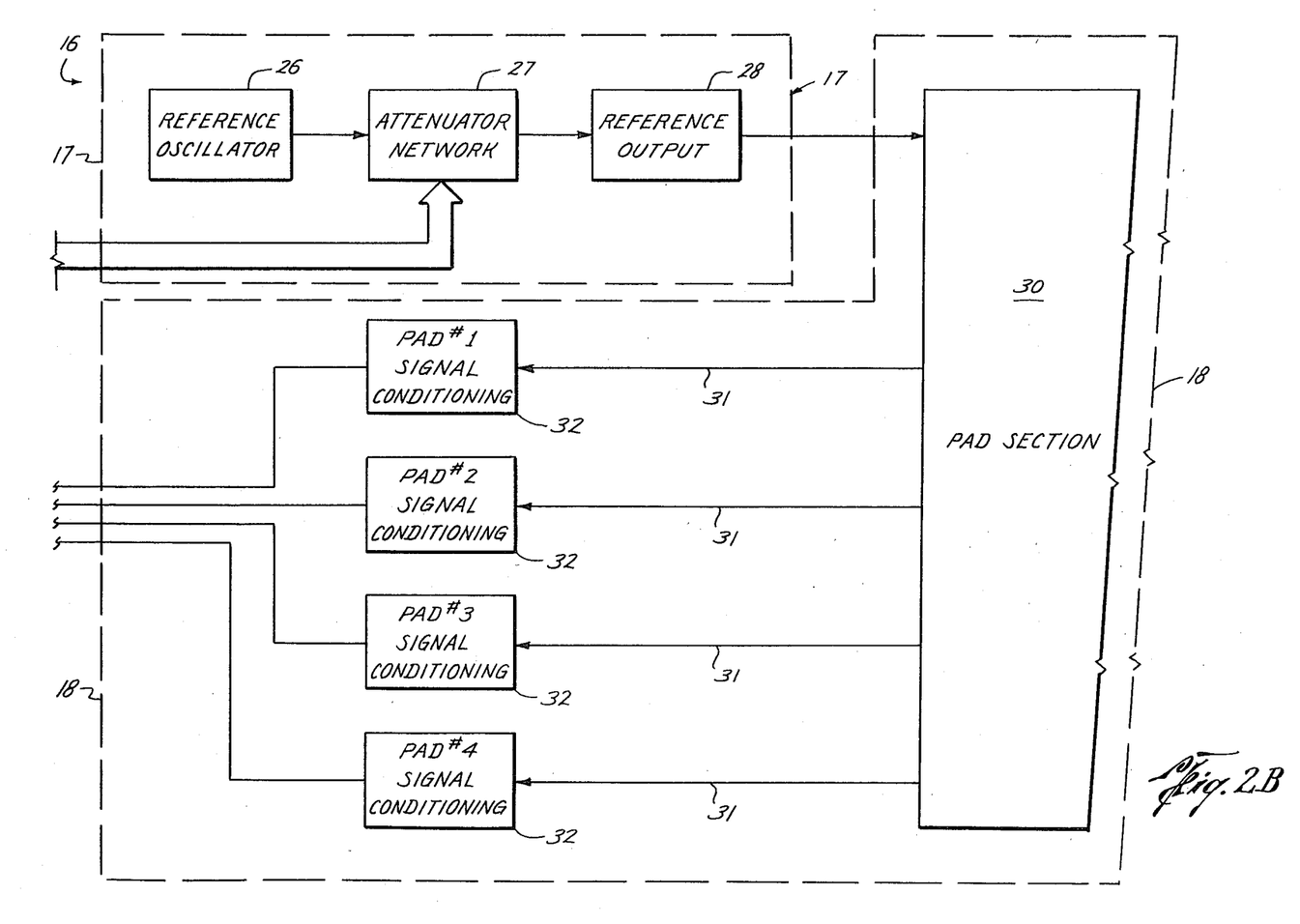

FIGS. 2A and 2B are block diagrams of the downhole dip meter apparatus according to the present invention. As may be seen from FIGS. 2A and 2B, the downhole dip meter well logging apparatus is comprised of four major components: telemetry/processing circuitry 16, oscillator circuitry 17, pad circuitry 18, and control bit generating circuitry 19.

Referring again to FIG. 2A, and more particularly to telemetry/processing circuitry 16, logging cable 12 is used as a conduit between the downhole circuitry and surface circuitry 25. Cable 12 preferably has several distinct lines or channels for transferring different types of information between the surface and the downhole apparatus. Circuitry 16 has a cable communications unit 18A for converting data signals obtained by the downhole apparatus into a suitably modulated form for transfer to the surface and vice versa. Interconnected with unit 18 is a microprocessor 20 having several functions, including the performing of a probe data smoothing algorithm as will be more fully discussed below.

Interconnected with microprocessor 20 is a programmable read only memory (PROM) unit 21 one of whose functions is to store the smoothing algorithm software. A random access memory (RAM) unit 22 is also interconnected with microprocessor 20 for storing various intermediate results obtained during the running of the smoothing algorithm and the like, as well as other functions conventional to the operations of a microprocessor and well known. Also a part of circuitry 16 is an instrument bus master unit 23 which matches the impedances of the various devices in the downhole apparatus.

Referring now to FIG. 2B, oscillator circuitry 17 is used to generate an alternating current for emission into the earth formation surrounding borehole 11. Oscillator circuitry 17 is comprised of three major components: a low frequency reference oscillator 26, electronic attenuator 27, and a reference output unit 28 for buffering the attenuated signal which is then delivered to the pad section 18 and thereafter into the formation to be investigated.

Figure 3:
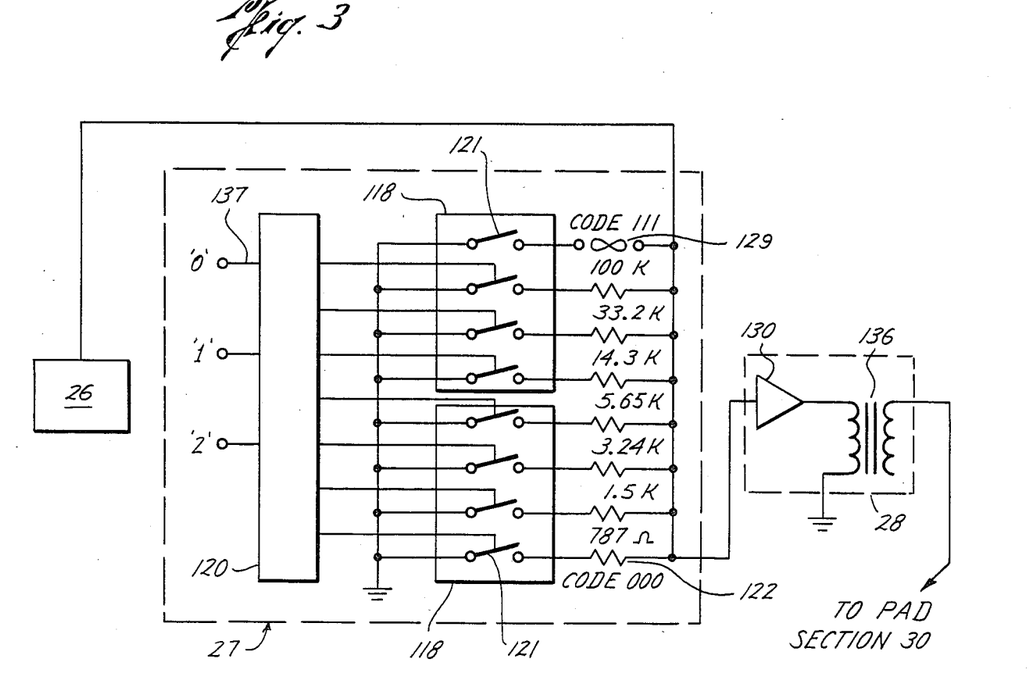
FIG. 3 is a more detailed schematic drawing of the attenuator network of FIG. 2B of the present invention.

Referring now to FIG. 3 which depicts, in further detail, the attenuator 27 of FIG. 2B, three voltage control bits (VCB's) 137 are routed from the microprocessor 20 to the terminals labelled 0, 1 and 2 of attenuator network 27. The VCB's act as correction values to instruct the attenuator network 27 by what amounts to adjust the voltage of a pad electrode in order to keep the measured voltage signals within a predetermined range. The VCB's are derived from measured signals of previous samples taken at other depths in a manner hereinafter described and thus are functionally related to the magnitude of expected or future formation measurements. The VCB's are continuously recalculated in light of previously derived measurements, as discussed below.

The VCB's are decoded by a binary-decimal unit 120. The signals are routed to switching units 118. One of switches 121 will be closed depending upon the value of the decoded or digitized VCB signal. Thus, if the digitized VCB signal corresponds to the lowest level of the pad voltage (i.e., code 000), the lowermost switch 121 will be closed and resistor 122 will be engaged. Similarly, if maximum voltage is required (i.e., code 111), uppermost switch 121 will be closed and resistance 129 (here, an infinite resistance) will be used.

The resulting signal from attenuator network 27 may be amplified and buffered by means of amplifier 130 and transformer 136. Transformer 136 provides a high current capability to maintain the pad at a constant voltage. The voltage constant from transformer 136 is then applied to probe pads 15 and to emitting electrodes 52 in a well-known conventional manner.

Thus in general, it may be appreciated that in response to VCBs 137 generated by microprocessor 20, attenuator 27 will attenuate output of oscillator 26 in discrete steps prior to amplification of attenuator output 28 and delivery to pad section 30 and ultimately into the formation.

It should be noted that FIG. 3 is a drawing for only a single probe pad. Similar sets of circuitry may be used for each probe pad in quadrature in the case of dip meter measurement.

To obtain formation penetration, it is necessary to prevent short circuiting from the emitting electrode or button 52 by the conductive drilling fluid immediately fronting the button. FIG. 4 depicts a cross-sectional view of a typical probe pad 15 contained in pad section 30. Probe pad 15 is comprised of pad button electrode 52 which emits current into adjacent earth formations. Adjacent to button 52 and encircling it is an insulator 54, which in turn is encircled by the metal guard electrode 56. The potential difference between pad button 52 and metal guard electrode 56 is continuously monitored and maintained near zero by guard circuitry 60 thus forcing current from the button electrode into the formation.

Referring again to FIG. 2B, the output signals of pad section 30 corresponding to measured signals for each probe pad 15 are transmitted via lines 31 to pad signal conditioning circuitry 32. Pad conditioning circuitry 32 detects, filters, and amplifies the voltage corresponding to the current into the formation by pad button 52 in ways which are well known in the art. A synchronous detector circuit is used to filter out undesirable noise whereby the synchronous detector is driven by the same oscillating signal output to the probe pads by attenuator network 27, so that signals of frequencies other than that of the injected current are rejected. Such synchronous detectors are well known in the art.

Referring now to FIG. 2A, after a pad signal has been rectified and filtered, it is sent via line 40 to data acquisition subsystem 41. Subsystem 41 also acquired data from other systems relating to other variables such as the orientation of tool 10 and borehole temperature. This information as sent on interface 42 which interfaces through the master bus 23 with microprocessor 20 and with a timing and control unit 43 which controls the sending of acquired signals to microprocessor 20 and instructions from the microprocessor 20 to the tools including tool 10.

Figure 5:
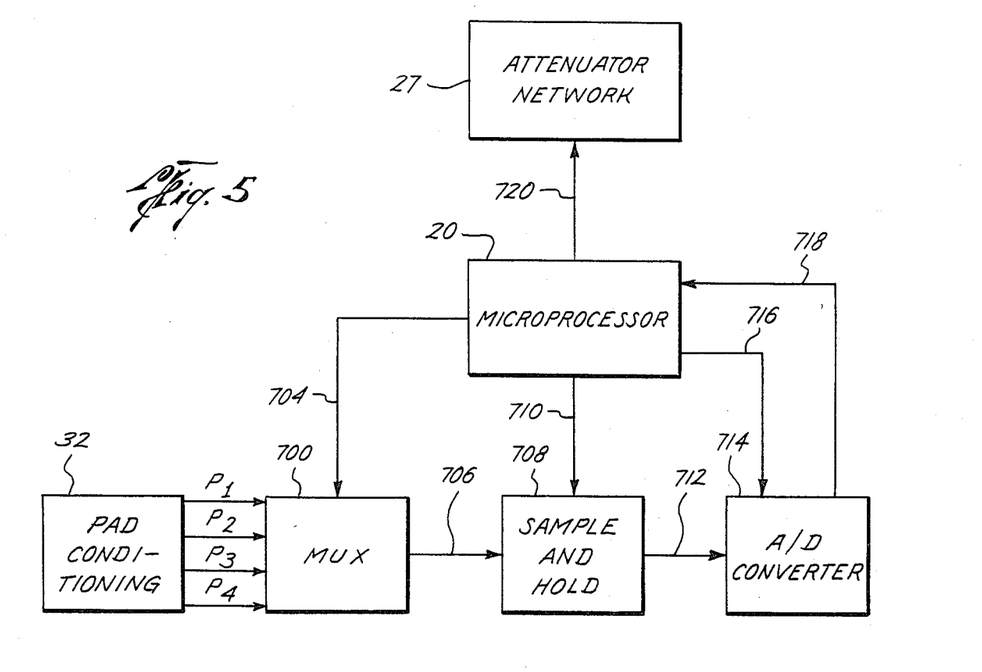
FIG. 5 is a more detailed functional block diagram of a portion of the circuitry of FIGS. 2A and 2B.

Referring now to FIG. 5, there may be seen more functional detail of a portion of the data subsystem 41 of the control bit circuitry 19 of FIG. 2A and its relation to microprocessor 20 of process circuitry 16 and to attenuator 27 of oscillator circuit 17. Multiplexer 700 sequentially accepts the slow varying d.c. signals output from each pad conditioning circuit 32. Microprocessor 20 sends a control signal via line 704 instructing multiplexer 700 when to accept and to output the pad signals $P_1$, $P_2$, $P_3$ and $P_4$. The pad signals are routed one at a time via line 706 to Sample and Hold unit 708. Microprocessor 20 sends a control signal via line 710 to Sample and Hold 708 instructing it when to sample and hold each of the varying d.c. pad signals. Sample and Hold 708 outputs the signals via line 712 to an analog-to-digital converter 714. Microprocessor 702 instructs A to D converter 714 via line 716 to sequentially convert the received signal to digital form. The resulting binary numbers are sent via line 718 from A to D converter 714 to microprocessor 20, whereupon a smoothing algorithm is performed on each digitized pad signal, as will be discussed below.

While the input signal from one pad is being sampled by Sample and Hold 708 and being digitized by A to D converter 714, multiplexer 700 will accept, at the direction of microprocessor 702, another pad signal. Thus, two or more distinct pad signals derived at the same borehole depth may be sequentially sampled, digitized and smoothed by a smoothing algorithm, thereby increasing processing efficiency.

When microprocessor 20 receives a digitized pad signal, it performs a smoothing algorithm. The purpose of the smoothing algorithm is to average successive digitized signals from each pad over a particular depth range. Gain adjustments will not be made after each reading, but only after the averaging depth range has been traversed. Of course it is within the scope of this invention to adjust the gain where needed after each pad reading or to change the averaging depth. In a preferred embodiment, however, four pad readings are obtained every one-sixty-fourth (1/64) of a foot in depth, but are averaged by a smoothing algorithm over a two (2) foot depth. A two foot depth interval was chosen by trial and error, as a desired depth interval simulating the response time of a human operator to large signal excursions.

An example of a smoothing algorithm separately used for each pad signal is given by the equation:

$$Y_N = X_N + K(Y_{N-1} - X_N)$$

where $X_N$ = present sample reading of a pad
$Y_{N-1}$ = running average of prior sample readings $Y_N$ = updated running average incorporating present sample reading K = a constant given by $K = e^{-t/T}$ which is approximately equal to $(1 - t/T)$ where t = a time interval functionally related to the sample depth interval (1/64 foot)

T = a time constant, functionally related to the smoothing depth interval (2 feet)

Due to the large number of multiplications which need be performed by the microprocessor to implement the above smoothing algorithm, it is desirable to minimize the number of required iterations. Techniques for so minimizing are well known in the art.

Figure 6:
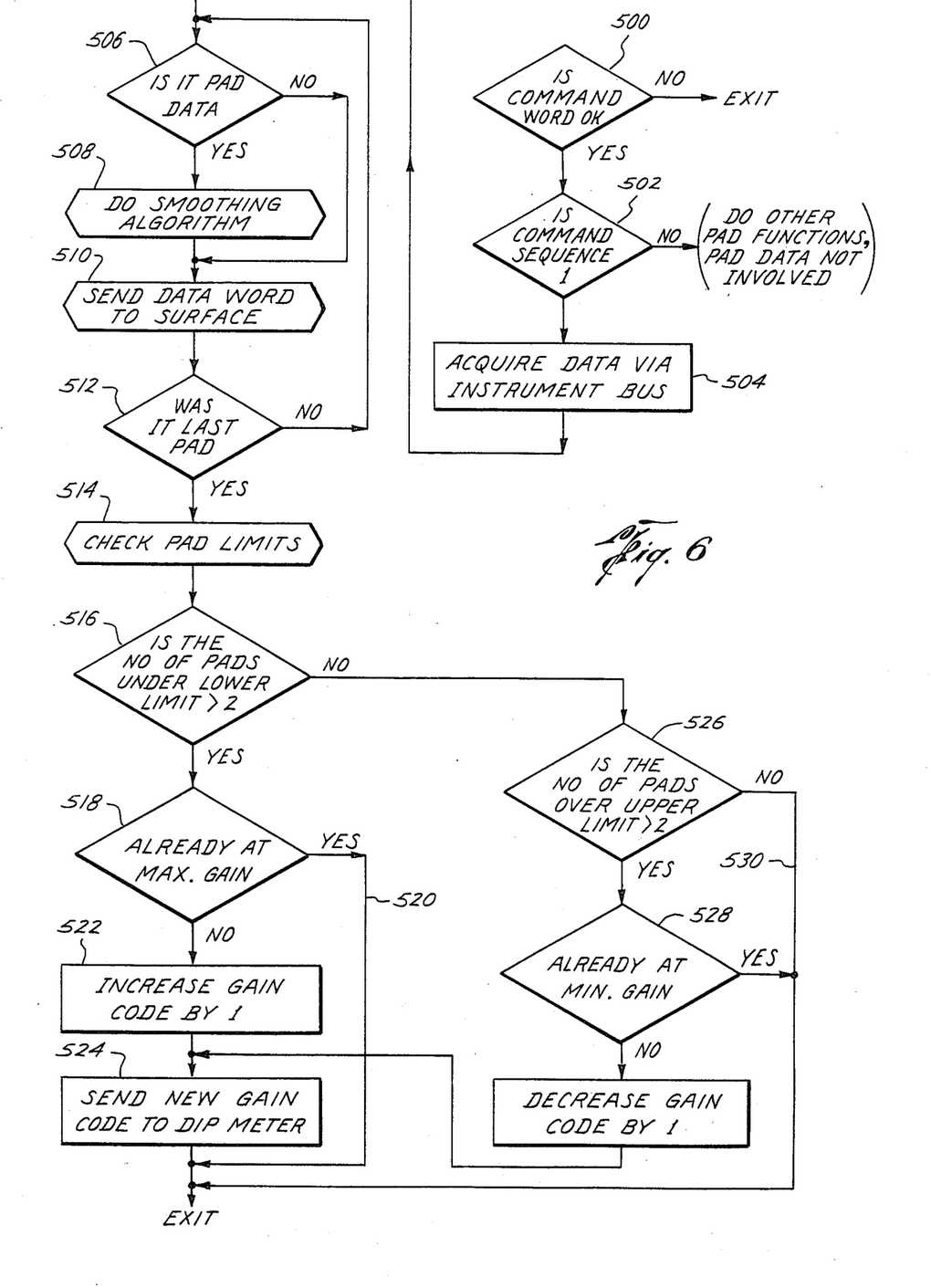
FIG. 6 is a flow diagram of a typical sampling operation according to the present invention.

FIG. 6 is a flow diagram of the steps carried out by microprocessor 20 during a typical dip meter downhole sampling operation. As sho,wn in FIG. 6, a command word from the surface is received and decoded downhole by cable communications 18A instructing the downhole microprocessor 20 to sample a dip meter measurement. Comparator step 500 determines whether the word received is in the proper form of a command word. If not, the sampling operation does not proceed. If the word is of proper form, comparator 502 decides whether the command word has the proper sequential form corresponding to a command to acquire data. If not, other nonacquisitional functions, such as the processing of already acquired data is performed. At step 504 the data is acquired, after which a comparator step 506 determines whether the acquired data corresponds to measured pad signals or to other data such as dip meter orientation measurements, depth measurements, etc. If the acquired data is not pad data, it is sent via step 510 to the surface for processing or interpretation. If the data acquired at step 504 is pad data, a smoothing algorithm is performed via step 508, as will be discussed below. Then the smoothed value is sent to the surface via step 510. Comparator step 512 determines whether pad data from all the pads has been acquired. If not, the data acquisition routine is run again.

A routine is now performed for determining whether the voltage of the pad electrodes should be adjusted to maintain the expected signal measurements for the next probe pad sample within a desired range. This routine determines the nature of such gain adjustments, if any, thereby determining the values of the reference voltage control bits (VCB's). These VCB's will be later transmitted by the microprocessor to the attenuation network 27 of FIG. 3, and will be used to adjust the gain, if needed, before the next set of smoothed pad data is determined. The three VCB's form a three digit binary word, each increment or decrement of which determines an adjustment in and by a factor of two. The value of the three digit gain code is equivalent to the exponent of a base two form of the gain adjustment. Thus, if the gain code is 111 = 7, the gain adjustment will produce $2^7 = 128$ times the lowest emitted current or voltage. The maximum gain is thus 128 or code 111.

Referring again to FIG. 6, comparator step 516 determines whether the number of pad signals smoothed or averaged over the depth interval (2 feet) having values under a lower limit is greater than two. Thus, step 516 determines whether there is a difference between the apparent magnitude of a smoothed pad signal and a desired range of magnitudes. This range of magnitudes is determined by predetermined upper and lower limits, as discussed below. The lower limit is a point such as one-eighth of the full scale dynamic range of the A/D converter 714 of FIG. 5. If more than two of the received pad signals are below the lower limit, it is desirable to increase the value of the emitted pad current so that future sample readings will not be so small as to be confused with noise. If three such signals are within the lower limit-upper limit range no gain change is required. However, if more than two (i.e., three or four) of the smoothed pad signals are below the lower limit, then it is desirable to increase formation current flow as discussed.

If the comparison step 516 results in an affirmative result, step 518 determines whether the maximum gain (i.e., control bit code 111) has already been reached. If so, the routine ends via control step 520. If not, the gain code is increased by a binary 1 at step 522 resulting in an actual gain increase by a factor of two. The new gain code is then sent to the tool at step 524, after which the routine ends.

If the result of comparator step 516 is a negative, then two or more smoothed pad signals are above the lower limit. In this event, comparator step 526 determines whether more than two of smoothed pad signals are greater than an upper limit. The upper limit is preferably one-half of the full scale deflection of the dynamic range of A/D converter 714. Ideally, the digitized pad output or received signals held in the A/D converter 714 will be maintained within the range of one-eighth to one-half of the full scale dynamic range thereof. If the result of comparator step 526 is a negative, then two or more of the smoothed pad signals are within the desired range. As previously discussed, with two pad signals within the desired range, no gain adjustment is made and the routine ends via line 530. If comparator step 526 results in an affirmative, it is desirable to decrement the gain. Step 528 determines whether the gain is already at minimum or zero. If so, the gain cannot be decremented, and the routine ends via line 530. If the minimum gain has not been reached, the gain code is decreased by a binary 1, resulting in an actual gain reduction of one-half. The new gain code is sent to the tool at step 524 and the routine ends.

It will be appreciated that numerous gain control algorithms may be used as alternatives to the one depicted in FIG. 6. Indeed, one of the major features of the present invention is that, if a programmable microprocessor is used, new gain control software may be easily substituted to achieve more effective gain control with respect to the particular earth formation being explored even during a logging operation. Thus, a different averaging interval such as 10 feet may be used, for example, depending upon the formation characteristics encountered.

Figure 7:
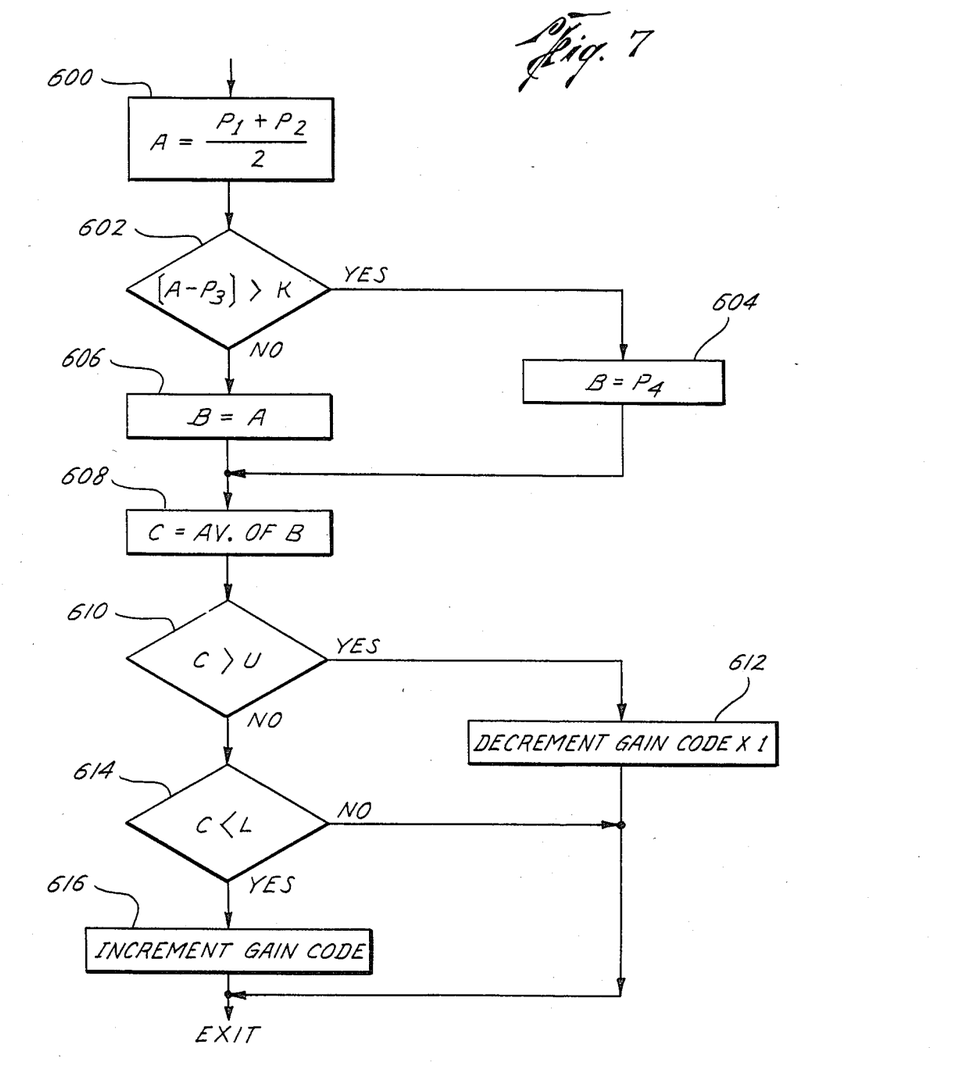
FIG. 7 is a flow diagram of a typical gain control algorithm of the present invention.

An example of an additional algorithm is shown in FIG. 7. Four probe pad output signals are measured and designated $P_1$, $P_2$, $P_3$, and $P_4$. Two of these measured values, $P_1$ and $P_2$, are averaged at step 600. Comparator step 602 determines whether a third pad value $P_3$ is within a range of K of the average of $P_1$ and $P_2$, where K is a constant. If $P_3$ is not within this range, then it is clear that either $P_1$, $P_2$ or $P_3$ significantly deviates from the other pad values although it is uncertain which. Such deviation may be caused by several factors, such as poor formation-probe pad contact resulting in unjustifiably high resistance reading, or by the presence of a low resistivity salt solution within the formation. If such a substantial deviation exists, all three values $P_1$, $P_2$ and $P_3$ are rejected and $P_4$ is chosen at step 604 as an accurate sample value. $P_4$ may be chosen with confidence in its accuracy since it is highly unlikely that two pad values will be inaccurate. If $P_3$ is within K of the averaged value, the averaged value, $(P_1+P_2)/2$, is chosen at step 606 as an accurate sample value. A running average C of all chosen values is updated at step 608. More samples are taken and the above routine is repeated until values corresponding to a borehole depth of 2 to 12 feet have been obtained. The running average is then calculated in accordance with the previously set forth smoothing algorithm or some other such desired algorithms and the result compared at step 610 to determine whether the average is greater than an upper limit, U. As discussed in reference to FIG. 6, the upper limit U as well as a lower limit L are chosen to be a function of the analog-to-digital converter range. U is preferably one-half of the A to D 714 range. If the running average C is greater than the upper limit U, the gain code is decremented by 1 at block 612. This results in an actual decrease of the emitted electrode voltage by a factor of $2^1=2$. The routine then ends. If the running average C is less than or equal to the upper limit U, comparator 614 determines whether C is less than a lower limit L. If not, then C is within the desired range between U and L, and the routine ends without a gain control adjustment being made. If C is less than L, the gain control code is incremented by 1 at step 616, and the routine ends.

Regardless of which gain control algorithm is used, the resulting adjusted gain control code is stored in RAM unit 22. After a predetermined borehole depth has been traversed by tool 10, microprocessor 20 sends the voltage gain control bits (VCB's) to the terminals of attenuator network 27 as discussed above. The gain of the emitted currents for the samples obtained over the next depth interval will be adjusted based upon adjustments made upon running averages of prior sample currents, as indicated by the correction value or VCB. Thus it is seen that a history of gain adjustments is used in a feedback loop to help maintain future, expected sample readings within a predetermined range. Moreover, these digitized VCB's or "gain codes" may be transmitted to the surface along with the actual digitized sample value residing in the A/D converter and corresponding to each sample. Thus a typical data word, for example, would consist of 12 bits (similar to the "mantissa") of the actual sample value and 3 bits indicating the binary multiplier or gain code (similar to the "ordinate") associated with the particular sample.

The VCB's are continually adjusted and stored in random access memory (RAM) unit 22. In addition, the pad signals as adjusted are also recorded on tape or stored in RAM unit 22. The stored correction values (VCB's) and the stored adjusted apparent magnitudes of the pad signals may be correlated to obtain visual or numerical representations of formation resistivities. Since representations of actual formation resistivities may thus be derived, the information obtained is more informative of true formation characteristics than if relative resistivities are derived, which has been typically the case in conventional dip meters previously known.

It is therefore apparent that the present invention is one well adapted to obtain all of the advantages and features hereinabove set forth, together with other advantages which will become obvious and inherent from a description of the apparatus itself. It will be understood that certain combinations and subcombinations are of utility and may be employed wihout reference to other features and subcombinations. This is contemplated by and is within the scope of the present invention.

The embodiments of the invention in which an exclusive property or privilege is claimed is defined as follows:

1. Well logging apparatus for investigating an earth formation, including apparatus for controlling the dynamic range of current flows established in the earth formation, comprising:
   electrode means in electrical contact with said formation for establishing current flow in said formation,
   circuit means in electrical contact with said formation for deriving a signal functionally related to the magnitude of said current flow,
   comparator means interconnected with said circuit means for comparing said magnitude of said signal to a selected range of magnitudes; and
   correction means interconnected between said electrode means and said comparator means for controlling the dynamic range of said current flow by adjusting said current flow as a function of said comparison derived by said comparator means.

2. The apparatus described in claim 1, wherein said correction means includes:
   attenuator means for adjustment of said current flow in discrete steps in response to said comparator means.

3. The apparatus described in claim 2, further comprising:
   processing means interconnected between said correction means and said comparator means for controlling the magnitude of said adjustment by said attenuation means as a function of said current flow.

4. The apparatus described in claim 3, further comprising:
   storage means interconnected to said processing means for storing the magnitude of said adjustment, said signal, and said range of magnitudes.

5. The apparatus described in claim 4, further including:
   correlation means for deriving a representation of formation resistivity from said magnitude of said signal and said adjustment.

6. The apparatus described in claim 1, further comprising:
   averaging means connected to said circuit means for deriving a signal functionally related to the average magnitude of a plurality of said current flows established in said formation.

7. A method of investigating an earth formation with a well logging instrument establishing current flows within the formation including controlling the dynamic range of current flows, comprising:
   establishing a first current flow within said formation,
   deriving a first signal functionally related to the magnitude of said first current flow,
   comparing said magnitude and a preselected range of magnitudes,
   deriving a difference between said magnitude of said first current flow and said selected range of magnitudes,
   deriving a correction signal as a function of said difference,
   establishing a second current flow within said formation adjusted by said correction signal to control the dynamic range of said second current flow, and deriving a second signal functionally related to the magnitude of said second current flow.

8. The method of investigating an earth formation as described in claim 7, further including:
storing said correction signal, said second signal, and said range of magnitudes, and
wherein said storing of said range is prior to said establishing a first current flow.

9. The method of claim 8, further including:
deriving a representation of formation resistivity from said stored correction signal and said second signal.

10. The method of claim 9, wherein said deriving a correction signal includes:
detecting when said second signal is within said selected range of magnitudes, and
maintaining said correction signal at a previous value when said second signal is within said preselected range.

11. Apparatus for investigating subsurface earth formations traversed by a borehole, comprising:
current means in electrical contact with said formations for establishing first, second, and third pluralities of current flows at respective first, second, and third locations within a borehole,
detector means in electrical contact with said formations for deriving signals functionally related to the magnitude of each current of said first and second pluralities of currents,
means for selecting from each of said first and second pluralities of currents at least one signal corresponding to a current penetrating said formation,
control signal generator means interconnected to said means for selecting said at least one signal for deriving a control signal corresponding to a function of said at least one signal from each of said first and said second plurality of currents, and
control means interconnected between said control signal, said generator means and said current means for altering magnitude of said third plurality of currents in response to said control signal.

12. The apparatus of claim 11, wherein said means for selecting at least one signal comprises comparator means for comparing at least a portion of said first and second pluralities of currents to a preselected range.

13. The apparatus of claim 12, wherein said control signal generator means includes means for generating first, second and third control signals when said function is less than, within, and greater than, said preselected range, respectively.

14. The apparatus of claim 13, wherein said control means includes means responsive to said first, second and third control signals for altering the magnitude of said third plurality of currents with respect to said second plurality of currents.

15. The apparatus of claim 14, wherein said means responsive to said first, second and third control signals includes an attenuator means for altering magnitude of said third plurality of currents in discrete steps as a function of said first, second and third control signals.

16. The apparatus of claim 15, wherein said means responsive to said first, second and third control signals further includes storage means for storing said first, second, and third control signals.

17. The apparatus of claim 16, further including transmitter means interconnected to said storage means for transmitting to the surface said first, second, and third control signals.

18. The apparatus of claim 17, wherein said attenuator means includes means for increasing by a discrete first factor, maintaining substantially constant, and decreasing by a discrete second factor said magnitude of said third plurality of currents in response to said first, second and third control signals, respectively.

19. The apparatus of claim 18, wherein said first factor is two and said second factor is one-half.

20. The apparatus of claim 19, wherein said control signal generator means includes means for deriving an average of said at least one signal from each said first and second plurality of currents.

21. The method of investigating an earth formation as described in claim 7, further including:
averaging the magnitude of said first and second derived signals, and
comparing said average magnitude and said preselected range of magnitudes.

22. A method for detecting characteristics of earth formations within a borehole, comprising:
generating a first plurality of currents at a first location within the borehole,
sequentially deriving first magnitudes of each said current of said first plurality,
selecting at least one of said first magnitudes corresponding to a current penetrating said formation,
storing said at least one of said first magnitudes,
generating a second plurality of currents at a second location within the borehole,
sequentially deriving second magnitudes of each said current of said second plurality,
selecting at least one of said second magnitudes corresponding to current of said second plurality penetrating said formation,
retrieving said at least one first magnitude,
generating a first function of said first and second magnitudes, and
generating a third plurality of currents at a third location within the borehole in response to said function of said first and second magnitudes.

23. The method of claim 22, further including the steps of:
storing parameters defining averaging functions of said first and second pluralities of currents prior to said generating said first plurality of currents; and
wherein said step of generating a function of said first and second magnitudes occurs after said retrieving said at least one first magnitude and comprises the steps of
retrieving at least a portion of said stored parameters; and
thereafter deriving an average of said retrieved at least one first magnitude and said selected at least one of said second magnitudes as a function of said retrieved parameters.

24. The method of claim 23, further including the steps of:
comparing said function to a preselected range of values,
detecting in response to said comparison when said function is less than, within, and greater than said preselected range, and
generating a control signal in response to said detection.

25. The method of claim 24, wherein said generating a control signal includes:

generating first, second and third control signals when said function is less than, within, and greater than said preselected range, respectively.

26. The method of claim 25, further including:
altering said magnitude of said third plurality of currents with respect to said second plurality of said currents as a function of said first, second and third control signals.

27. The method of claim 26, wherein said altering step includes:
discretely increasing, holding substantially equal to said second magnitude, and discretely decreasing said magnitude of said third plurality as a function of the presence of said first, second or third control signals, respectively.

28. The method of claim 27, further including transmitting said control signal and a corresponding function of magnitude of at least one of said third plurality of currents to the surface.

29. The method of claim 28, further including:
sequentially deriving third magnitudes of each of said currents of said third plurality, and
generating a second function of second and third magnitudes different from said first function.

30. The method of claim 29, wherein said step of discretely increasing, holding substantially equal, and discretely decreasing comprises:
discretely increasing by a factor of two said magnitude of said third plurality as a function of the presence of said first control signal;
holding said magnitude of said third plurality substantially equal to said second magnitude as a function of the presence of said second control signal; and
discretely decreasing by a factor of one-half said magnitude of said third plurality as a function of presence of said third control signal.

* * * * *